July 5, 1949.  L. B. RIVARD ET AL  2,474,985
VEHICLE BODY CONSTRUCTION
Filed April 27, 1946
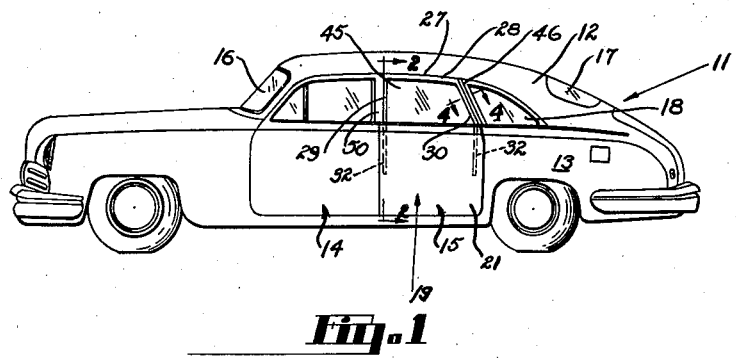
Fig. 1
Fig. 3
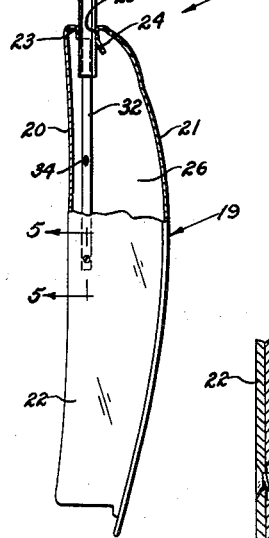
Fig. 2
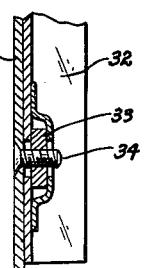
Fig. 5
Fig. 4
L.B. RIVARD
C.F. DICKASON
INVENTORS.
BY C.C. McRae
R.G. Harris
J.R. Faulkner
T.H. Oster
ATTORNEYS.

Patented July 5, 1949

2,474,985

UNITED STATES PATENT OFFICE 2,474,985

VEHICLE BODY CONSTRUCTION

Lawrence B. Rivard, Dearborn, and Carl F. Dickason, Ann Arbor, Mich., assignors to Ford Motor Company, Dearborn, Mich., a corporation of Delaware Application April 27, 1946, Serial No. 665,556

3 Claims. (Cl. 296—44)

This invention relates generally to a body construction for automotive vehicles.

Heretofore, automobile bodies of the closed or permanent top type have generally been provided with sheet metal doors in which the upper portion of the door was formed integrally with, and comprised a continuation of, the lower portion thereof. Although the upper portion of the door, which defines a window opening, is usually slightly thinner than the lower portion, it is nevertheless of substantial thickness and requires a considerable amount and weight of material. In addition, a separate garnish molding must be provided completely around the interior of the window opening to create a satisfactory appearance. The construction of doors for bodies of the convertible top type has been somewhat different, and usually comprises either a narrow window frame carried by the window and retractable into the lower portion of the door, or a narrow U-shaped frame, separately formed and rigidly attached to the door to provide a window frame and guide. In the past, considerable difficulty has been encountered in providing a proper seal between the latter type of door and a body of the convertible type.

The present invention contemplates the construction of an automobile body in which each door has a relatively thick lower section formed of inner and outer sheet metal panels in the usual manner, and a separate relatively thin window supporting frame positioned above the lower door section and rigidly secured thereto. The separate window supporting frame is generally channel shaped, ribbed for strength, and provided with an outwardly extending flange at the outboard side of the door which is adapted to overlap the marginal edges of the vehicle body at the door opening. Suitable resilient sealing means are provided between this outboard flange and the body. The channel of the frame supports a glass run which slideably receives the window glass. Since the window supporting frame used by the present invention is separate from the rest of the door, it can be chrome plated to enhance its appearance. The frame, in fact, presents a distinctive and custom appearance both when viewed from the exterior and the interior of the door. In addition, a continuous garnish molding is not required on the interior since the frame forms its own molding strip. A further advantage of the invention resides in the extremely satisfactory air and water seal provided between the door and the body.

Other objects and advantages of the invention will be made more apparent as this description proceeds, particularly when considered in connection with the accompanying drawings, in which:

Figure 1 is a side elevation of an automobile embodying the present invention.

Figure 2 is a cross sectional view, partly in elevation, taken substantially on the plane indicated by the line 2—2 of Figure 1.

Figure 3 is a cross sectional view through the sheet metal channel forming the window frame.

Figure 4 is a cross sectional view taken substantially on the plane indicated by the line 4—4 of Figure 1.

Figure 5 is a cross sectional view taken substantially on the plane indicated by the line 5—5 of Figure 2.

Referring now more particularly to the drawings, there is shown in Figure 1 an automobile having a body 11 of the closed or permanent top type. The body type illustrated is a four door sedan, having roof and side panels 12 and 13 respectively, and formed with door openings for the front and rear doors 14 and 15. The usual windshield 16 and rear window 17 are provided, and a fixed window 18 is located in the quarter panel rearwardly of the door 15.

Inasmuch as the construction of each door is similar, a detailed description of the construction of the rear door 15 will suffice. The lower door section 19 of the door 15 is constructed in conformity with conventional practice of an inner door panel 20 and an outer door panel 21. Each panel is a sheet metal stamping, and the inner panel 20 is preferably formed with marginal flanges 22 extending at right angles thereto and forming wide jamb faces around the sides and bottom of the lower door section. The outer panel 21 is welded or otherwise suitably secured to the flanges 22 of the inner door panel to form a unitary door section of substantial thickness. The upper edges 23 and 24 of the inner and outer door panels 20 and 21 respectively are bent inwardly and then downwardly as shown in Figure 2 to form a slot 25 extending longitudinally along the top of the lower door section 19 and opening into the well 26 formed between the door panels. A suitable garnish molding (not shown) may be used to cover the top of the inner panel 20 and the inturned edge 23.

It will be noted that the lower door section 19 is located completely in the lower portion of the door opening and terminates a substantial distance below the top of the opening. A separate window supporting frame 27 is carried by the lower door section 19, being located above the latter and defining the window opening. The window supporting frame 27 is generally U-shaped in overall configuration, having a generally horizontal upper section 28, and upright legs 29 and 30 extending downwardly therefrom and through the slot 25 in the lower door section and into the well 26. Channels 32 are spot welded to the lower ends of the legs 29 and 30 and form extensions thereof. Cage nuts 33 are carried by the channels 32 at spaced points and cooperate with screws 34 to rigidly connect the channels 32 to the flanges 22 forming the jamb faces of the door.

From the foregoing description it will be apparent that the window frame 27 is rigidly supported upon the lower door section 19, fitting snugly in the slot 25 between the inturned edges 23 and 24 of the door panels and being secured by the screws 34 to the jamb faces 22.

As best seen in Figures 2, 3 and 4, the window supporting frame 27 is formed of sheet metal and has an overall thickness substantially less than the thickness of the lower door section 19. The frame has a base 35 forming a jamb face, and an inwardly extending side flange 36 at the inboard edge of the base 35. At the junction between the base 35 and the inboard side flange 36, the window supporting frame is formed with a bead or rib 37, which not only provides strength and rigidity but also cooperates with a wind strip, as more fully discussed hereinafter.

At the outboard edge of the base flange 35, the window supporting frame is bent outwardly to form a marginal flange 38 extending substantially at right angles to the base. The marginal flange 38 is formed with a return bend portion 39 lying closely adjacent to the marginal flange and extending inwardly and terminating in a side flange 41 generally similar in shape to the inboard side flange 36.

Located within the channel formed by the base 35 and the side flanges 36 and 41 of the window supporting frame is a U-shaped glass run 42, of conventional construction. The free edges 43 and 44 of the inboard and outboard side flanges 36 and 41 respectively are bent or crimped toward each other to engage the marginal edges of the glass run 42 and to retain the latter in position. A window glass 45 is slideably supported within the glass run 42, and is adapted to be lowered into the well 26 in the lower door section by suitable regulator mechanism (not shown).

With particular reference to Figure 4, the relationship between the window supporting frame 27 of the rear door 15 and the door pillar 46, forming part of the vehicle body, is shown. A resilient sealing strip 47 of rubber or other suitable material is cemented to the shoulder 48 formed adjacent the outboard side of the door pillar 46. The sealing strip 47 has an outward edge portion 49. It will be apparent that the marginal flange 38 of the window supporting frame is adapted in its closed position to overlap the door pillar 46, and to engage the curved edge portion 49 of the sealing strip 47. The marginal flange 38 at the upper portion 28 of the window supporting frame similarly overlaps the vehicle body at that point and engages a similar resilient sealing strip secured to the latter. In like fashion, the door pillar 50 between the front and rear doors carries a similar sealing strip engaged by the overlapping flange 38 of the leg 29 of the window supporting frame. The rib 37 at the inboard edge of the base 35 of the frame is adapted in the closed position of the door to engage a wind strip 51 extending around the upper portion of the door opening and secured to the door pillars and the vehicle body. The wind strip 51 provides an additional seal between the door frame and the body.

Upon reference to Figure 4, it will be seen that the fixed rear quarter window 18 is carried within a window supporting frame 52, similar in construction and cross sectional shape to the window supporting frame 27, and provided with an outwardly extending flange 53 and a base 54. An L-shaped resilient sealing strip 55 is located between the door pillar 46 and the rear quarter window frame 52, and resiliently engages the base 54 and the outwardly extending marginal flange 53 of the frame. Screws 56 secured the frame 52 to the door pillar and clamp the sealing strip 55 therebetween.

From the foregoing description it will be apparent that although the present invention may be used with the doors of automobile bodies of the convertible type, it is particularly adapted for bodies of the closed or rigid top type. Since the upper door section is a separate member, it is possible to very easily apply a different finish thereto, such as chrome, thus obtaining a pleasing and trim appearance. Inasmuch as the window supporting frame is substantially thinner than the upper portion of the conventional door structure, a considerable saving in metal and in the cost of the door results. In addition, the dies for the inner and outer door panels are simplified and rendered less expensive. The marginal flange of the window supporting frame overlaps the edges of the body at the door opening, and an effective seal is maintained between the door and the body by a resilient sealing strip. A further saving in cost and improvement in appearance is effected by the elimination of the necessity for a continuous garnish molding completely around the window, only a single garnish molding strip at the upper edge of the lower door section being required.

It will be understood that the invention is not to be limited to the exact construction shown and described, but that various changes and modifications may be made without departing from the spirit and scope of the invention, as defined in the appended claims.

What is claimed is:

1. In a motor vehicle, in combination, a body having top and side panels and a door opening formed therein, a door forming a closure for said door opening and having a relatively thick lower door section and a separate upper door section substantially thinner than said lower door section, said upper door section comprising a sheet metal channel having a base forming a jamb face, a side flange extending inwardly from the inboard edge of said base, a marginal flange extending outwardly a substantial distance from the outboard edge of said base and having a return bend portion extending inwardly closely adjacent said marginal flange and inwardly of said base to form a side flange, a glass run carried within said channel and supported by said side flanges, a window glass slideably received within said glass run, and a resilient sealing strip between the outwardly extending flange at the outboard side of said window channel and the marginal edges of said body at said door opening.

2. In combination with a vehicle body having an opening therein, a closure for said opening comprising a window supporting channel formed of sheet metal and having a base, a side flange extending inwardly from the inboard edge of said base, said sheet metal channel being formed with an outwardly projecting bead at the intersection of said base and side flange, a marginal flange extending outwardly a substantial distance from the outboard edge of said base and having a return bend portion lying closely adjacent said marginal flange and extending inwardly of said base to form a side flange spaced from said first-mentioned side flange, a glass run supported between said base and side flanges, the inner edges of said side flanges being bent inwardly to retain said glass run in position, a window glass received within said glass run, and a resilient sealing strip between said window supporting channel and the marginal edges of the opening in said body.

3. In a motor vehicle, in combination, a body having top and side panels and a door opening formed therein, a door forming a closure for said door opening and having a relatively thick lower door section and a separate upper door section substantially thinner than said lower door section, said upper door section comprising a sheet metal member having a base forming a jamb face, a side flange extending inwardly from the inboard edge of said base with an outwardly projecting bead being formed at the intersection of said base and said inboard side flange, a marginal flange extending outwardly from the outboard edge of said base and projecting a substantial distance outwardly beyond the bead at the inboard edge of said base, said sheet metal member being arranged in relation to said door opening so that said inboard bead has an over-all dimension smaller than the door opening and passes therethrough, while said outboard marginal flange has an over-all dimension greater than said door opening and overlies the adjacent edges of said top and side panels, and a return bend portion projecting inwardly from said marginal flange and lying closely adjacent thereto and extending inwardly of said base to form an outboard side flange spaced from said inboard side flange, a glass run supported between said base and said side flanges, the inner edges of said side flanges being bent inwardly to retain said glass run in position, a window glass received within said glass run, and a resilient sealing strip between the projecting marginal flange of said member and the adjacent edges of said top and side panels.

LAWRENCE B. RIVARD.
CARL F. DICKASON.

REFERENCES CITED

The following references are of record in the file of this patent:

UNITED STATES PATENTS

| Number | Name | Date |
| --- | --- | --- |
| 1,767,703 | Rusch | June 24, 1930 |
| 1,790,931 | Ledwinka | Feb. 3, 1931 |
| 1,965,014 | Trautvetter | July 3, 1934 |
| 2,144,161 | Lee | Jan. 17, 1939 |
| 2,165,594 | Waterhouse, Jr. | July 11, 1939 |
| 2,260,997 | Ledwinka | Oct. 28, 1941 |
| 2,272,034 | Calhoun | Feb. 3, 1942 |